Patented Dec. 28, 1948

2,457,493

UNITED STATES PATENT OFFICE 2,457,493

ART OF MAKING PHENOL-ALDEHYDE REACTION PRODUCTS AND THE PRODUCT THEREOF

Donald V. Redfern, Seattle, Wash., assignor to American-Marietta Company, Adhesive, Resin and Chemical Division, Seattle, Wash., a corporation of Illinois No Drawing. Application September 3, 1947, Serial No. 772,016

12 Claims. (Cl. 260—57)

REISSUED
MAR 20 1951
RE23347

The present invention relates to the art of making phenol aldehyde reaction products and the products thereof and, in more particular, to a phenol-aldehyde resulting from, and the reaction using, an alkali as a catalyst, viscosity reducer and solubilizer, and adding such alkali stepwise to limit the Cannizzaro reaction and to increase the degree of condensation while still maintaining water solubility.

The application is a continuation-in-part of application Serial No. 722,975 filed January 18, 1947, the latter application being a continuation-in-part of application Serial No. 510,209 filed November 13, 1943, both said applications now abandoned.

The material formed by the present process finds particular application as an impregnator for paper and cloth, a binder for plywood, and as a molding material or a binder in a molded product. In fact, the product finds a new use wherever a fast-setting high molecular weight resin is needed.

In the prior art of producing phenol formaldehyde resins, when using an alkali as a catalyst, the setting-up time from the soluble stage to the insoluble-infusible stage has been long; long, at least, as compared with the time of the present invention.

The concept of the present process is that of prolonging, expanding, or widening the condensation reaction in the water-soluble phase, with the consequent shortening and moving along of the final reaction, i. e., setting into an insoluble-infusible product, with a resulting improvement of the final product as to insolubility and infusibility. Considering the reaction as a multiplication or increasing of the chemical linkages of the material under reaction, the longer this multiplication on linkages is continued before a final setting into infusibility and insolubility, the better will be the final product. It would seem obvious that this multiplication of linkages would be at a greater rate, would be more uniform, would be more stable, and would result in longer and more cross chains of linkages if the reaction were to be carried out in the liquid or solution stage, instead of the solid or semi-solid phase.

In speaking of his product as soluble in water, applicant is speaking of the salt of the resin as found in an alkaline solution. If the solution is neutralized, then the neutral resin is, for all practical purposes, insoluble both in water and ethyl alcohol, ethanol.

In the prior art, it has always been considered that the end of the soluble stage, just before the final act of setting into the insoluble-infusible stage, has been reached when the viscosity curve began to rise sharply. Processing, except for the final setting and possible mixing with other compounds, was then terminated. The final setting usually consisted of placing the material in its final form or location and then applying the heat and/or a catalyst to effect solidification. In the prior art this setting into the insoluble-infusible stage has been a relatively long time.

The group of compounds referred to as "a phenol" are those potentially reactive phenols, such as phenol, cresylic acid, resorcinol, xylenol, and other monohydric and dihydric phenols known in the art. The expression "a phenol" as herein used is to be given a recognized meaning in the art and includes both monohydric and dihydric phenols in which one or two hydroxyl groups are attached to the carbon ring. As examples of the "aldehydes" that may be used in the performance of the present invention, there are cited: formaldehyde, acetaldehyde, furfural, and benzaldehyde. This condensation reaction is generic to aldehydes and poly-functional aldehydes. In carrying out the present invention the aldehydes used may comprise any of the prior art aldehydes used in producing phenol-aldehyde condensation products.

In the prior art, it was considered necessary to further the reaction in the water-soluble stage by a careful control of the temperature with respect to time, and the art has several interesting examples of temperature-time curves for the water-soluble stage. It is obvious that controls of this type are a hindrance to rapid production of the resin. Also, in the present invention lower phenol-aldehyde ratios may be used to increase the water solubility without a reduction in time, as the control of the reaction rate by the stepwise addition of alkali allows the reaction in the presence of large amounts of formaldehyde to be carried on rapidly at high temperatures.

Having in mind the above, it is an object of the present invention to produce a water-soluble phenol-aldehyde reaction product that has had a maximum possible reaction prior to setting into the insoluble-infusible stage.

A further object of the present invention is the production of a phenol-aldehyde reaction resin by a process having a wide range of time-temperature relations.

Yet another object of the present invention is the prolongation of the water-soluble stage reaction and a shortening of the setting time of the final product.

Another object of the present invention is the production of a phenol-aldehyde reaction product that is no longer soluble after slight heating for a short period of time.

It is also an object of the present invention to form a final-set phenol-aldehyde resin that is insoluble in water, alcohol, acid, or alkali.

It is also an object of the present invention to produce a product which, upon addition of alkali in the later reaction stages, will produce solubility and some slight reaction, but which reaction and solubility zone is narrow, so that a short final reaction, that is, setting period, usually brought about by heating, will give an infusible and insoluble material which cannot be readily solublized by further additions of alkali.

A further object of the present invention is the formation of a process for, and the production of, a liquid resin which is soluble in water in all proportions, but is substantially insoluble in ethyl alcohol, ethanol.

Another object is the provision of a liquid phenolic resin which is highly stable during long storage.

Another object is the carrying out of the phenolaldehyde reaction, by the stepwise addition of alkali to limit the Cannizzaro reaction.

A further object of the present invention is the formation of phenol-aldehyde resins by a process that allows a much wider variation in the phenol-formaldehyde ratios and the formaldehyde-alkali ratio than was possible in the prior art.

The present invention in one of its forms is directed to a process for producing a thermosetting phenol-aldehyde resin condensation product comprising forming an aqueous mixture of a phenol selected from the group consisting of phenol, cresol, xylenol and resorcin and an aldehyde in which the aldehyde group is the sole reactive group, and an alkaline catalyst accelerating the formation of the resin reaction-product on heating, the amount of catalyst used to catalyze the reaction is that amount which is capable of producing an alkalinity equivalent to the alkalinity produced by sodium hydroxide in an amount not over 10% of the total mixed constituents. The molar ratio of the aldehyde to the phenol varies from 1:1 to 3:1. The resulting mix is heat-reacted to produce a water soluble phenol-aldehyde reaction-product, the viscosity of the latter increasing during this initial reaction period and being indicative of the advancement of the water soluble reaction-product toward the stage where the water soluble state terminates, said aldehyde retaining its reactivity during the formation of the water soluble phenol-aldehyde reaction-product. The increased viscosity of the water soluble reaction-product and its tendency to progress to a water insoluble reaction-product is reduced by adding additional alkaline material and further condensing the water soluble resin to a stage where the aqueous solution of the mix shows a precipitate upon the addition of ethanol, said condensation product remaining water soluble and having a pH range varying between 9.5 and 14. This alternate step of adding an alkaline material and condensing may be repeated a number of times as hereinafter more fully set forth.

It has been found that the phenol-aldehyde reaction for a resin may be carried out by adding quantities of alkali and heating to a point where there is a sharp rise in the viscosity (this being well known in the art) to produce a water-soluble initial phenol-aldehyde reaction product and then adding further quantities of alkali to reduce the viscosity and then further heating until the viscosity again begins to rise rapidly. The reaction may be carried out as a continuous operation of adding alkali and heat, that is, a continuous control of the reaction by the stepwise addition of alkali and the continuous control of temperature. If carried to the limit, these stepwise acts of adding alkali to reduce viscosity and heating to further the reaction can be carried on until the addition of further amounts of alkali will not decrease the viscosity. Further heating for a short time, for example, thirty seconds to ten minutes, at temperatures from 285° F. to 150° F., will then give an insoluble-infusible stage product.

This adding of alkali in small quantities while progressing the reaction is important, as it helps curb side reactions, such as the Cannizzaro reaction. As shown by Roger Adams in his book, "Organic Reactions," vol. II, 3d edition, published by John Wiley & Sons, Inc., New York, N. Y., 1944, pages 98 and 99, the Cannizzaro reaction is particularly liable to take place when the concentration of alkali is greater than 10% in the presence of free aldehyde, this is a 2.95 normal alkaline solution. If the alkali is added in large amounts at high temperatures, it will react with the formaldehyde to convert it to methyl alcohol and formic acid, thus preventing the phenol-formaldehyde condensation. This reaction has been the main stumbling block which has prevented the prior art from progressing the reaction to the stage obtainable by the present process. Applicant has limited the Cannizzaro reaction by the stepwise addition of alkali. This reduces the alkali present while there is a large amount of free formaldehyde present, controls the reaction rate, resolublizes the product, and allows the resinification of the phenol and formaldehyde to continue.

This control of viscosity by the stepwise addition of an alkali is for the purpose of continuing the water soluble stage reaction to a greater degree of condensation than has heretofore been considered possible. The rising viscosity which threatens to terminate the water-soluble stage reaction, is continually reduced, or knocked down, by the addition of alkali. This high degree of condensation, while still maintaining the resin in the water-soluble phase, clearly defines and separates this resin from the resins of the prior art.

The amount of alkali added at each step and the number of steps are determined by the desired control over the progression of the reaction, as evidenced by the viscosity and solubility and extent of the Cannizzaro reaction. The amount of alkali that may be added under various conditions is exemplified in the various specific examples. The general description and discussion preceding the specific examples gives an outline of the limits of alkali additions as well as the limits of the other ingredients.

L. H. Baekeland, in his article "The syntheses, constitution and uses of Bakelite," published in "The Journal of Industrial and Engineering Chemistry," vol. 1, No. 3, March, 1909, pages 149, 155, defines the three stages of a phenolic resin, as follows:

*A-stage, initial condensation product*

"At ordinary temperatures, may be liquid, or viscous or pasty or solid. It is soluble in alcohol, acetone, phenol, glycerine and similar solvents; is soluble in NaOH. Solid A is brittle and melts if heated. All varieties of A, heated long enough under suitable conditions will change first into B, then finally into C."

*B-stage, intermediate condensation product*

"Is solid at all temperatures. Brittle, but slightly harder than solid A, at ordinary temperatures; insoluble in all solvents but may swell in acetone, phenol, or terpineol without entering into complete solution. If heated, it does not melt, but softens decidedly and becomes elastic and somewhat rubber-like, but on cooling, becomes hard again and brittle. Further heating under suitable conditions changes it into C. Although B is infusible, it can be molded under pressure in a hot mold to a homogeneous, coherent mass, and the latter can be further changed into C by the proper application of heat."

*C-stage, final condensation product*

"Is infusible, insoluble in all solvents; unattacked by acetone; indifferent to ordinary acids, or alkaline solutions; is destroyed by boiling in concentrated sulfuric acid, but stands boiling with diluted sulfuric acid; does not soften to any serious extent if heated, stands temperatures of 300° C.; at much higher temperatures begins to be destroyed and chars without entering into fusion; it is a bad conductor of heat and electricity."

By my invention I am able to advance the resins beyond this stage of solvent insolubility and still maintain them in an alkaline solution phase. This stage, that of a resin advanced so that it is no longer soluble except in a high alkaline solution, is very close to the final C-stage and I have designated it as the incipient C-stage, in order to distinguish it from the A-stage, the B-stage, and the C-stage, as defined by Baekeland and to distinguish it from other prior art resins.

The difference between my resin in the incipient C-stage and other resins is clearly shown in the following table by the comparison between the "Redfern" resin, made according to the present process, the "Van Epps" resin, made in accordance with the disclosure of Clarence F. Van Epps, Patent No. 2,360,376, of October 17, 1944, and the "Nevin" resin, made in accordance with the disclosure of J. V. Nevin, Patent No. 2,150,698, of March 14, 1939.

were air dried for 48 hours, then the solubility in ethanol was determined. Moisture contents of the air-dried resins were determined and all values corrected for this.

Oftentimes in actual practice it is difficult to bring the water-soluble stage along to the maximum possible reaction with an intervening storage time of several days or weeks before the final setting. For this reason, the commercial product is usually stopped short of the maximum so as to minimize the possibility of setting before the desired time. However, even when stopping short of the maximum water-soluble stage reaction by the present process, as was done in the above comparison, the reaction has been carried so much further than the prior art reactions, that the setting time to the insoluble-infusible stage is much shorter than the prior art setting times. As an example of this rapid setting time, using a resin of the present invention, two $\tfrac{3}{16}$" three-ply panels were glued together and pressed in a hot press at 200 p. s. i. and 260° F. in 5.5 minutes.

Many, if not all, of the bases of the alkali metals, and the alkaline salts of the alkali metals may be used for solublizing and for catalyzing during the reaction period. Applicant has found that the most desirable range for the end of the water-soluble stage is a pH above 9.5. Some of the weaker bases and salts may be used for raising the pH in the lower ranges and the stronger reagents used in the upper ranges, the main criteria being that of raising the pH to increase solubility, although, as stated above, the optimum seems to lie above 9.5 pH.

By use of the term "alkaline material" as herein set forth, it is intended to include chemicals such as those enumerated herein, and other alkaline material, that will have the desired effect of raising the pH of the material to the level which will give solubility, further the reaction, and/or catalyze the reaction.

Some of the bases of the alkali metals and the alkaline salts of the alkali metals that may be used are the carbonates and hydroxides of: sodium, potassium, lithium, barium, calcium, and magnesium. Ammonium hydroxide and ammonium carbonate may also be used.

It has also been found that such compounds as sodium phenate may be used, that is, the initial alkali may have been combined with the phenol prior to the beginning of the reaction. The desideratum is that the alkali, such as those listed above, should be present in a form which insures

*Physical appearance and solubility of resins*

| Alkaline Resin | Redfern | Van Epps | Nevin |
| --- | --- | --- | --- |
| Percent water soluble | 100% | 100% | 100% |
| Percent ethanol soluble | 8.8% | 100% | 100% |

The aqueous solution of the Redfern water-soluble resin reaction-product shows a precipitate upon the addition of ethanol.

its availability for combination with the reaction product during the water-soluble stage, that is, any salt of a phenol which will release an element

| Neutral Resin | Redfern | Van Epps | Nevin |
| --- | --- | --- | --- |
| Percent water-insoluble | 84.8% | 10.3% | 32.25% |
| Percent ethanol insoluble of water insoluble | 91.9% | 9.4% | 00.00% |
| Physical appearance of water insoluble | Light pink curd. | Black gummy mass. | Light tan gummy mass. |

Neutral resins were prepared by neutralizing the resin solutions to a pH of 7.0, filtering the precipitated resins and washing with distilled water until free of sodium. The washed resins that will form an alkaline solution.

In the measurements of his pH, applicant has used a Beckman pH meter with a calomel electrode and a lithium glass electrode and standardized at pH 10 to compensate for the alkali metal ion effect.

In the prior art, alkalies (sodium hydroxide being generally used) have been used as catalytic agents only. In the present reaction, the alkalies are also being used to solublize the product. This is probably done by the alkali combining with the resin to form a water-soluble product. During the setting period, portions of the alkali are freed. It is probable that this freed alkali will then act as a catalytic agent to speed the setting and to shorten the setting time. This is considered to be important, as it has been found that many of the prior art products may be treated by the addition of an alkali just prior to the setting not only to solublize but to speed up the final reaction and to produce a superior product.

There have been set forth above certain phenols, aldehydes, and alkalies, as being specific materials that may be used in the performance of the present invention; however, these materials and others, are the ones generally recognized in the art for the making of resins of this general type.

In the prior art, it has been necessary to carefully control the temperature, because once the viscosity begins to increase sharply, the reaction must be stopped if an immediate conversion to the insoluble-infusible stage is to be prevented. In the present process, the control of the temperature is of far less importance, as the viscosity may be reduced by additions of further alkali.

Another factor entering into reactions of the type mentioned herein, is that of the molar ratio of the aldehyde to the phenol. The variation is largely dependent upon the type of product desired, the particular compounds used, and the stability of the product. Applicant has found that progression of the reaction as herein set forth enables him to obtain greater variation in the aldehyde-phenol ratio than was possible in the prior art.

The theoretical limits for the formaldehyde-phenol ratio are 1:1 and 3:1. The prior art has not been able to obtain a satisfactory resin with a smaller ratio than 2.5:1. Applicant has found that he can obtain a very satisfactory resin throughout the range of 1:1 to 3:1. He attributes this to the completeness of the reaction, the extent of the linear chains and cross chains obtainable by the present process. In the smaller ratios every link is important. In the larger ratios, curtailment of the Cannizzaro reaction is important. The condensation is promoted in both the larger and smaller ratios by the present process.

The use of, or the presence of, an alkali insures the stability of the alkaline resin solution at room temperature. This is especially important because in the industry the preparation of the water-soluble stage material is usually performed by a separate organization from that which sets the resin into its final insoluble-infusible stage. This is illustrated by the plywood industry, which purchases its resin from outside sources and then, in its own plant, performs a final blending or mixing of the resin with other ingredients, such as animal blood, fillers, water, etc., to effect the desired glue or bonding material for spreading on the veneer sheets prior to the pressing and heating of the plywood to effect the final setting into the insoluble-infusible stage of the resin.

Herebelow and preceding the examples is a general description and discussion thereof. In those examples using phenol, such has a 40° C. freezing point about ten parts of the water are used for premixing the phenol. All during the initial addition of phenol and aldehyde, and following the first adding of alkali, called the mix period, until the initial temperature is raised, and during the following heating and additions of alkali, called the cook period, the mixture of materials is agitated.

The ratios given are molar ratios of aldehyde to caustic to phenol. All viscosities are given in poises at 25° C., and such is indicated by the symbol "$\eta$" (eta). When, as in Example 1, there is found the expression "8.9 parts of 50% NaOH, 5.5–8.8$\eta$" the meaning is that the addition of the alkali will give the stated viscosity. If it is stated, "Hold 75° C. for 40 min. to 6.00–10.00$\eta$," the meaning is that the stated viscosity is controlling, and the time may vary, as it is only of secondary importance. When the reaction is indicated as being carried to insolubility, "to insol." this is insolubility at 25° C.

The limits of the molar ratios of the ingredients to phenol are: water, zero to 26.1; formaldehyde, 1 to 3; and sodium hydroxide, 0.22 to 2.5. As above noted, the phenol used in the examples is stated as 40° C. freezing-point phenol. This is a reduction of the examples to a uniform basis, as other freezing-point phenols have been used. In all ingredients, the molar value is controlling and not the particular concentration or chemical. The amount of phenol is given in all examples as 100 parts by weight. The actual weight used is determined by the processing facilities. The actual weight will in some measure determine the various time periods, due to the time required to go from one temperature level to the next. The first column of the examples gives the parts by weight. The temperatures given are in degrees centigrade.

A small amount of water, about ten parts, is premixed with the phenol to facilitate the handling thereof. When the phenol is in the kettle, water is added from zero to about 26 mols, depending upon the percentage of solids in the final resin required, and to give the desired reaction control. With resins of a low total solids, it is desirable to add some of the water later in the reaction, in fact, the total water may be added in small amounts during the whole of the process.

The above aqueous solution is maintained between 15° C. and 40° C. To this solution is added the aldehyde. Varying the formaldehyde-phenol molar ratio changes the properties of the final resin with regard to flow and setting characteristics. However, all the ratios used permit the advancement of the resin into the B-stage and then the incipient C-stage, which incipient C-stage is defined as a characteristic of the resins of this invention.

After the aldehyde has been thoroughly mixed with the above constituents, and while the temperature is still maintained between 15° C. and 40° C., the reaction period is started by the addition of initial alkali solution, with constant agitation of the mix. The alkali solutions may be varied from 10% to saturated aqueous solutions, or otherwise. The sodium hydroxide added at this point or its molecular equivalent in other alkalies is used as a catalyst for the reaction of the phenol and formaldehyde. The effect of varying the amount of catalyst is reflected primarily in the rate of reaction.

The initial alkali expressed as sodium hydroxide should not be over 10% of the total initial mix, which is a 2.95 normal alkaline solution. Example 8, infra, shows an initial caustic of 5.25% and Example 9, infra, 0.7%. As previously stated, throughout the process, the alkali may be continuously added.

When the initial alkali has been added and thoroughly mixed in, the mix period is closed and the cook period initiated by raising the temperature above 40° C. and up to boiling, around 100° C. The time taken to raise the mix to cook temperature may vary greatly, from five minutes to four hours or more, depending upon the size and heat transfer ratios of the mix and equipment. This cook temperature is determined by the time which may be allowed for this step and by the size and type of kettle, or reactor. The temperature is, in many cases, brought to the boiling point and the materials refluxed, as such speeds the reaction to the greatest possible extent. The refluxing temperature is broadly from 95° to 105° C., depending upon the reaction mix and the size and type of reactor vessel.

The cook is continued at the above temperature until the viscosity of the mix reaches a pre-determined value indicating the approach of the end-point of a cook for prior art water-soluble resins. When a large mix is involved, it is well to drop the temperature before reaching the end-point so that the reaction will be slowed and the end-point not passed over. In certain ratios of formaldehyde, caustic, and phenol, the resin advances to an alkaline insoluble stage. In such certain resins, this insoluble point, instead of viscosity, is used as the determining point for the addition of more caustic to maintain solubility of the resin. The reaction is a function of the time-temperature ratio. The important controlling point is the solubility or viscosity of the resin when in the alkaline solution, which is a function of the advancement of the reaction. The viscosities stated may be varied over a wide range, depending upon the proportion of aldehyde to phenol and the time temperature ratio variations.

At this stage, as insolubility, or the C-stage, approaches, a further amount or amounts of alkali are added, in order that the reaction may be continued and progressed beyond that found in the prior art. This further amount of alkali solubilizes the resin and decreases the viscosity. The further amount or amounts added in one or more steps, are determined by these requirements of solubility and reaction progression. As indicated above, as these further amounts of alkali are added, it is desirable that the reaction be carried on at reduced temperatures to prevent over-running of the end point and passing into the C-stage. The specific examples given hereinafter illustrate this technique and give particular amounts.

The final viscosity may vary from 0.5 to 2000 $\eta$. This value is more or less arbitrary, depending upon the type of product desired. In all cases, when the desired viscosity is obtained, the mix is cooled to below 40° C. to stop the reaction. While above, stepwise additions of caustic were used, equivalent results may be obtained by adding the solubilizing alkali continuously during the reaction or in a varying number of steps from two to infinity.

In all final mixtures, the pH should be between 9.5 and 14.0, so that they will have a good storage life.

Example 1

| | |
|---|---:|
| Phenol | 100 |
| Water | 93.6 |
| 37% formaldehyde | 177.5 |
| 50% NaOH | 37.9 |

Mix and bring to 100° C. in 100 minutes
Reflux to 0.50$\eta$, cool to 72° C. in 140 minutes 32–36$\eta$

| | |
|---|---:|
| 50% NaOH, 5.5–8.8$\eta$ | 8.9 |

Hold 75° C. for 40 minutes to 6.0–10.00$\eta$

| | |
|---|---:|
| 50% NaOH, 2.75–3.00$\eta$ | 19.3 |

Hold at 80° C. for 60 minutes
Cool below 40° C., 4.30–5.00$\eta$

Final: 4.3–5.00$\eta$, pH 12.68, 42% solids. Ratio: 2.04:0.79:1.0.

Example 2

| | |
|---|---:|
| Phenol | 100 |
| Water | 109 |
| 37% formaldehyde | 147 |
| 50% NaOH | 18.5 |

Mix and bring to 100° C. in 100 minutes
Reflux for 290 minutes, 27.00$\eta$

| | |
|---|---:|
| 50% NaOH | 25.9 |

Cool to 60° C. in 50 minutes, 6.50$\eta$

| | |
|---|---:|
| 50% NaOH | 7.4 |

Cool to below 40° C., 3.00$\eta$

Final: 3.00$\eta$, pH 10.50, 42% solids. Ratio: 1.70:0.61:1.

Example 3

| | |
|---|---:|
| U. S. P. cresol | 100 |
| Water | 81.3 |
| 37% formaldehyde | 142.2 |
| 50% NaOH | 33.0 |

Mix and bring to 85° C. in 100 minutes
Hold for 80 minutes, 10.00$\eta$
Cool to 65° C.
Hold for 67 minutes, 46.00$\eta$

| | |
|---|---:|
| 50% NaOH | 7.9 |

Hold at 65° C. for 13 minutes, 10.70$\eta$

| | |
|---|---:|
| 50% NaOH | 17.6 |

Raise to 80° C. and hold for 86 minutes, 3.30$\eta$
Cool below 40° C.

Final: 3.30$\eta$, pH 13.02, 42% solids. Ratio: 1.9:0.79:1.0.

Example 4

| | |
|---|---:|
| Petroleum cresylic | 100 |
| Water | 81.3 |
| 37% formaldehyde | 142.2 |
| 50% NaOH | 33.0 |

Mix and bring to 61° C. in 100 minutes and hold to 0.50$\eta$
Cool to 58° C. in 80 min., 5.0$\eta$

| | |
|---|---:|
| 50% NaOH, 2.70$\eta$ | 7.9 |

Cook at 58° C. for 27 minutes, 5.00$\eta$

| | |
|---|---:|
| 50% NaOH, 2.60$\eta$ | 17.6 |

Cook at 60° C. for 12 minutes
Cool below 40° C., 3.70$\eta$

Final: 3.70$\eta$, pH 12.72, 42% solids. Ratio: 1.9:0.79:1.0.

Example 5

| | |
|---|---:|
| Phenol | 100 |
| Water | 350.9 |
| Furfural | 193.9 |
| 50% NaOH | 37.9 |

Mix and bring to 98° C. in 100 minutes

| | |
|---|---:|
| 50% NaOH | 9.0 |

Reflux for 5 minutes to insolubility

| | |
|---|---:|
| 50% NaOH | 6.8 |

Reflux for 87 minutes to insolubility

| | |
|---|---:|
| 50% NaOH | 2.1 |

Reflux for 13 minutes to insolubility

| | |
|---|---|
| 50% NaOH | 2.9 |

Cool to 90° C. in 56 minutes to insolubility

| | |
|---|---|
| 50% NaOH, cool below 40° C., 3.10η | 8.5 |

Final: 3.10η, pH 11.70, 42% solids. Ratio: 1.9:0.79:1.0.

Example 6

| | |
|---|---|
| Phenol | 100 |
| Water | 228.2 |
| Acetaldehyde | 89 |
| 50% NaOH | 37.9 |

Mix and bring to 100° C. in 100 minutes
Reflux

| | |
|---|---|
| 50% NaOH added in small increments during reflux, insolubility control | 73.6 |

Total reflux time, 905 minutes
Cool below 40° C.

Final: 42% solids. Ratio: 1.9:1.33:1.0.

Example 7

| | |
|---|---|
| Phenol | 100 |
| Water | 364.3 |
| Benzaldehyde | 214.3 |
| 50% NaOH | 37.9 |

Mix and bring to 100° C. in 100 minutes
Reflux

| | |
|---|---|
| 50% NaOH added in small increments during reflux, insolubility control | 178.6 |

Total reflux time, 1,120 minutes
Cool below 40° C.

Final: 60% solids. Ratio: 1.9:2.55:1.0.

Example 8

| | |
|---|---|
| Phenol | 100 |
| Water | 189 |
| Formaldehyde | 216 |
| 50% NaOH | 59.3 |

Mix and bring to 100° C. in 100 minutes
Reflux for 140 minutes, 148η
Cool to 75° C. in 20 minutes

| | |
|---|---|
| 50% NaOH | 149.0 |

Hold 75° C. for 30 minutes
Cool below 40° C., 63η

Final: 63η, pH 12.30, 37% solids. Ratio: 2.50:2.45:1.0.

Example 9

| | |
|---|---|
| Phenol | 100 |
| Water | 131 |
| Formaldehyde | 108 |
| 50% NaOH | 5.2 |

Mix and bring to 100° C. in 90 minutes
Reflux for 70 minutes to insolubility

| | |
|---|---|
| 50% NaOH | 4.0 |

Reflux for 30 minutes to insolubility

| | |
|---|---|
| 50% NaOH | 4.0 |

Cool to 90° C.
Hold for 30 minutes to insolubility

| | |
|---|---|
| 50% NaOH | 5.6 |

Cool to 75° C.
Hold for 30 minutes
Cool to 40° C., 4.75–5.00η

Final: 4.75–5.00η, pH 10.25, 38% solids. Ratio: 1.25:0.22:1.0

Example 10

| | |
|---|---|
| Phenol | 100 |
| Water | 106.3 |
| 37% formaldehyde | 172.2 |
| 50% NaOH | 40.25 |

Mix and bring to 95° C. in 120 minutes
Reflux for 100 minutes
Cool to 60° C., 1.48η

| | |
|---|---|
| 50% NaOH | 9.53 |

Cool below 40 C., 46.3η

Final: 46.3η, pH 10.5, 42% solids. Ratio: 2.00:0.585:1.0.

Example 1, above, will be given hereinbelow in more detail for an easier understanding of this and the other examples. The details of this and the other examples are details which on the whole are not given in the general discussion above of all the examples.

In Example 1, the phenol is premixed with 11 parts of water to facilitate handling and is placed in an agitated, jacketed reaction kettle. All during the addition of the reagents and during the reaction the materials are agitated. In this example 82.6 parts of water is the preferred amount added at this point. To the above aqueous solution, which is maintained, preferably at 20° C., aqueous commercial, or C. P. 37% formaldehyde solution, which may contain up to 15% methanol, is added. The amount is 177.5 parts or 2.04 mols of formaldehyde to one mol of phenol.

After the formaldehyde has been thoroughly mixed with the above constituents and while the temperature is still maintained at 20° C., a 50% aqueous sodium hydroxide solution is added. The 50% concentration is used because of its availability and ease of handling. For this example, the 50% caustic solution is 37.9 parts, which is a ratio of 0.44 mol of the caustic per mol of phenol.

After the caustic is added, the reaction mixture is heated with constant agitation to a point where the mixture begins to boil and is refluxed. The time taken to raise the reaction mixture to the boiling temperature is from 80 to 120 minutes for this example.

The reaction mix is refluxed until the alkaline solution has reached a predetermined viscosity of 0.50η. This viscosity can be varied, depending upon the composition of the reaction mixture and the properties of the desired resin. In this example, the reaction is then gradually cooled to 70° to 73° C. over a period of from 60 to 140 minutes and held until a preferred viscosity of 32 to 63η is obtained, with a maximum variation between 22 and 100 poises.

At this point the neutralized resin is in the B-stage and is from 85% to 90% water insoluble. The time and temperatures stated here are preferred for this example, but longer times may be used at temperatures as low as 40° C. and shorter times at temperatures as high as 100° C.

At this stage, which is the normal end-point for water soluble resins of the prior art, 8.9 parts of 50% aqueous caustic solution or its equivalent in other alkalies is added in order that the reaction may be continued. This caustic addition solubilizes the resin in the alkaline solution and decreases the viscosity to give 5.5 to 8.8 poises. The amount of caustic added at this stage varies from the stated amount, as the formaldehyde-phenol ratio and the time-temperature ratio varies. The quantity of caustic required is determined by the amount necessary to solubilize the reaction products. Without this caustic addition, continuation of the heating of the resin will advance it quickly into the C-stage. The reaction is continued at 70° to 80° C. for 40 minutes or the equivalent time-temperature ratio, to obtain a viscosity of 6 to 10η and a neutralized resin which is 87.5 to 92.5% water insoluble but will still flow under pressure.

At this stage, 19.3 parts of 50% caustic are added to reduce the viscosity of the reaction mix from 6 to 10 poises to 2.75 to 3.00 poises. Broadly, this caustic may again vary from this stated amount depending upon the original ratio of the reacting constituents and the time-temperature ratio employed in the reaction. In all cases, the amount required is determined by the desired reduction in viscosity or increase in solubility.

The specific reaction is continued at 75° to 85° C. until a final preferred viscosity of 4.3 to 5.0η is reached. The final pH is 12.60 to 12.80.

In actual usage, and particularly in making plywood, there are five variable factors used in the evaluation of a phenolic resin adhesive. These factors are curing rate, adhesion of the cured product, assembly time, storage life, and spreadability. Waterproofness is not a variable factor.

The resins of all the examples give adhesives with nearly perfect adhesion. The resins of Examples 1 and 8 are very satisfactory when so evaluated. They have a fast curing time in the press, perfect adhesion, and long storage life. The spreadability is good, and the assembly time is rather short. These two examples illustrate the wide variation in caustic that may be had and yet the resins have similar use characteristics.

Generally, a reduction in storage life means a faster setting resin. This is true of Examples 6, 7, and 10. Also, these three examples show wide variations in caustic.

Examples 3, 4, 5, 6, and 7 illustrate to some extent the wide variety of ingredients that may be used in the practice of the present invention.

Examples 8 and 9 illustrate the wide variation in the molar ratio of aldehyde that may take place under the present invention. These two examples further illustrate the wide variation in caustic that may be used. Generally, more caustic is used with an increase in the aldehyde, but this is not necessarily true, as the various examples indicate.

The evaluation of Example 2 is not quite the same as Example 1. The curing rate of Example 2 is slower, but the assembly time is longer. The other factors are similar to Example 1. Examples 1, 2, 3, 4, 5, and 10 give good general usage adhesives. The other examples indicate the extent of variation in ingredients that may be had and still obtain a desirable resin. In many instances such variations find particular application, such as impregnators and for uses requiring fast setting.

As a binder for plywood, 500 parts of the liquid resin is mixed with 100 parts of water and 80 parts of walnut shell flour until a smooth lump-free, uniform mix is obtained. This extended resin is spread by the use of a mechanical spreader on both sides of a 1/16" fir veneer core at the rate of 60 lbs. per 1000 sq. ft. of core. The core is faced with 1/8" fir veneer faces. The entire assembly is then placed in a hot press where it is pressed at 200 lbs. per sq. in. and at 140.5° C. for 3.5 minutes. These panels when tested in accordance with the present U. S. Department of Commerce specification for Douglas fir plywood, CS 45-45, tested a minimum of 90% wood failure instead of the required 60%.

In the prior art it has not been possible to use water soluble phenolic compounds to improve the fiber in soft-boards, hard-boards, or webs, so that such products are stronger, smoother, more waterproof, or harder. This failure of the prior art to use water soluble phenolic compounds for fiber and board improvement has been due to a lack of resin retention by the fibers and the inability of the prior art resins to advance to the insoluble stage under operating conditions. Applicant's resins obviate these prior art defects and are usable for fiber board and web improvement because they are advanced to the incipient C-stage, further than the prior art resins. This allows them to be almost completely precipitated and 85% to 90% of the resin added to the slurry is retained on and in the fibers and the resin is set to the C-stage under operating conditions possible in board and paper manufacturing plants.

In the use of the present resin in fiber improvement, the herein set forth water soluble phenolaldehyde resin is added to and evenly dispersed in the fiber slurry or web and the resin is acidified to a pH of about 6.0 to 4.0 to precipitate the resin on and in the fibers. The fiber, board, or web has excess water removed, usually by suction and the fibers are heated to set the resin to the final insoluble stage. In the case of various fibers boards, this heating may take place in a press or drying oven. In paper making, this heating may be done on the calendering rolls.

In the making of pulp and paper board, and the use therein of any resin, there is formed a slurry of water and waste wood broken down under various mechanical or semi-chemical means or methods in which the fibers are individually separated. The pH of this slurry is adjusted to approximately 7 and the resin added thereto in amounts from 10 to 50% of the dry weight of the pulp. This slurry is then agitated until a uniform resin fiber dispersion is obtained.

After obtaining a uniform dispersion of the resin in the fiber slurry, the resin is precipitated on and in the fiber by reducing the pH of the slurry to 4.5 plus or minus about 1. Acetic acid, hydrochloric acid, sulfuric acid, alum, or other acid or acid salt may be used to obtain this reduction in pH, the criteria being that of an acid or acid salt capable of obtaining this desired reduction in pH.

The fiber slurry containing the precipitated resin is then formed on a screen and the excess water removed by suction. This water may be returned and reused in the process. The pulp mass is then pressed and dried in the manner now common in the formation of pulp board and paper board. Insofar as possible, without detriment to the fibers, it is desirable that the temperature be raised high enough and maintained high long enough to permanently set the resin into the C-stage.

By using the highly condensed resin of my invention, a high resin retention of at least 85% to 95% on the fiber is obtained by acid precipitation. This precitated resin is then converted to an infusible, water-insoluble, solvent-resistant compound under heat, or heat and pressure.

In the making of paper, the resins of the present invention may be used with a resulting improvement in many of the physical characteristics of the finished product. In the practice of the present invention in paper making, from 0.5 to 50% resin, based on the dry weight of the paper pulp, is added to the paper slurry prior to the sheet formation, preferably in the beater chest. The paper, resin, and slurry mixture is then thoroughly agitated and is acidified by the addition of the same or similar acids or acid salts mentioned in connection with the processing of paper board above, to a pH of approx. 6 to 4. The acidified paper slurry is diluted to the desired concentration, usually about 0.3%, by weight of pulp, and the paper sheet is then formed in the conventional manner of passing the paper slurry upon a screen and removing the excess water by suction, and then carrying the formed sheet over a series of heated rolls. These heated rolls dry and calender the paper and will set the resin to the final C-stage.

By the use of a highly advanced phenol aldehyde resin of my invention, and its acid precipitation on and in the fibers of the paper, 85% to 90% of the resin added to the paper slurry is retained in the finished web.

The resins of my invention may also be used to impregnate a web or sheet of paper, cloth, or other fibrous material already formed. Previously formed web may be impregnated, either by a batch process or by a continuous operation along the sheet or web.

In the continuous process of impregnating a fibrous sheet or web of material, the material to be impregnated is run through an aqueous solution of the resin in a concentration dependent upon the percent of resin desired in the finished sheet. After the fibrous material has been completely saturated, it is run from the resin bath through a set of squeegee rolls or doctor blades to remove excess resin solution. The web is then run through an acidifying bath adjusted to a pH of approximately 4.5 plus or minus 1. This acid bath may contain any of the acids previously mentioned for acidifying and precipitating the resin on and in fibrous material. When the sheet is run through the acidifying bath, the resin is deposited in situ on and in the fibers of the web. As the web leaves the acidifying bath it is doctored to remove excess acid. The web is then passed over and between heat and pressure rolls to set the resin and obtain the desired finish for the web.

If it is desired, a web may be impregnated with the resins of my present invention by a batch treatment. In such treatment, the web is placed in a solution of resin which solution is at a concentration depending upon the amount of resin desired in the finished web. When the web has been thoroughly impregnated with the resin by mechanical agitation or other desirable means, the batch is acidified by adding acid of the nature previously disclosed above to precipitate the resin in and on the fibers of the web. After precipitation of the resin in the fibers of the web, the sheet or web is removed from the batch and then treated with heat and pressure to set the resin and obtain the desired finish for the web.

In the impregnating of previously formed fibrous webs, as contrasted to the treatment of loose fibers in a slurry, it is not as necessary to precipitate the resin on the fibers by an acid treatment as it is when the fibers are loose in a slurry. For this reason, the impregnated web may be taken directly from the impregnating solution and passed over heating and pressure rolls to set the resin. However, such a treatment does not give as good impregnation and bonding of the resin to the fiber.

The herein method of producing a thermosetting phenol-aldehyde condensation product comprising forming a water soluble phenol-aldehyde condensation product, and reacting the latter until the condensation product advances to a stage where it becomes insoluble in an aqueous alkaline solution and then resolubilizing the insoluble resin in its aqueous alkaline solution by adding thereto an alkaline medium, is claimed in copending application Serial No. 58,373, filed November 4, 1948.

The herein described method of forming a cellulose fiber product bonded with an insoluble infusible phenol-aldehyde resin is claimed in copending application Serial No. 58,372 filed November 4, 1948.

Having thus described my invention, I claim:

1. The process of producing a thermosetting phenol-aldehyde resin condensation product comprising forming an aqueous mixture of a phenol selected from the group consisting of phenol, cresol, xylenol, and resorcinol, an aldehyde in which the aldehyde group is the sole reactive group, and an inorganic alkaline catalyst accelerating the formation of the resin reaction-product on heating, said catalyst expressed as sodium hydroxide being present in an amount equivalent to not over 10% of the total mix constituents, the molar ratio of the aldehyde to the phenol varying from 1:1 to 3:1, heat-reacting said mix and producing a water-soluble phenol-aldehyde reaction product, the viscosity of the latter increasing during this initial reaction period and being indicative of the advancement of the water-soluble reaction-product towards a stage where the water-soluble state terminates, said aldehyde retaining its activity during the formation of the water-soluble phenol-aldehyde reaction-product, reducing the viscosity of the water-soluble reaction-product and its tendency to progress to a water-insoluble reaction-product by adding additional inorganic alkaline material, and further condensing the water-soluble resin to a stage where an aqueous solution of the mass shows a precipitate upon the addition of ethanol, said condensation reaction-product remaining water-soluble, said alkaline material increasing the pH of the finally condensed product to between 9.5 and 14 inclusive.

2. The process of producing a thermosetting phenol-aldehyde resin condensation product comprising forming an aqueous mixture of a phenol selected from the group consisting of phenol, cresol, xylenol, and resorcinol, an aldehyde in which the aldehyde group is the sole reactive group, and an inorganic alkaline catalyst accelerating the formation of the resin reaction-product on heat, said catalyst being present in an amount equivalent to not over 10% of the total mix constituents expressed as sodium hydroxide, the molar ratio of the aldehyde to the phenol varying from 1:1 to 3:1, heat-reacting said mix and producing a water-soluble phenol-aldehyde reaction-product, the viscosity of the latter increasing during this initial reaction period and being indicative of the advancement of the water-soluble reaction-product towards a stage where the water-soluble state terminates, said aldehyde retaining its activity during the formation of the water-soluble phenol-aldehyde, alternately adding to said initial resin condensation product a further amount of inorganic alkaline material and then after each addition of the alkaline material condensing the alkaline-treated resin reaction-product, each time the alkaline material is added there being a reduction of the viscosity of the water-soluble resin reaction-product and the tendency of the water-soluble reaction-product to progress towards a water-insoluble stage thereby permitting a further condensation of the resin reaction mass without conversion of the resin reaction mass to a water-insoluble state, said additions of alkali being terminated while the resin reaction-product is in a water-soluble stage, the aqueous solution of the water-soluble resin reaction-product showing a precipitate upon the addition of ethanol, said alkaline material increasing the pH of the finally condensed product to between 9.5 and 14 inclusive.

3. The process of producing a thermosetting phenol-aldehyde resin condensation product comprising forming an aqueous mixture of phenol, an aldehyde in which the aldehyde group is the sole reactive group, and an inorganic alkaline catalyst accelerating the formation of the resin reaction-product on heating, said catalyst being present in an amount equivalent to not over 10% of the total mix constituents expressed as sodium hydroxide, the molar ratio of the aldehyde to the phenol varying from 1:1 to 3:1, heat-reacting said mix and producing a water-soluble phenol-aldehyde reaction product, the viscosity of the latter increasing during this initial reaction period and being indicative of the advancement of the water-soluble reaction-product towards a stage where the water-soluble state terminates, said aldehyde retaining its activity during the formation of the water-soluble phenol-aldehyde reaction-product, reducing the viscosity of the water-soluble reaction-product and its tendency to progress to a water-insoluble reaction-product by adding additional inorganic alkaline material, and further condensing the water-soluble resin to a stage where an aqueous solution of the mass shows a precipitate upon the addition of ethanol, said alkaline material increasing the pH of the finally condensed product to between 9.5 and 14 inclusive.

4. The process of producing a thermosetting phenolaldehyde resin condensation product comprising forming an aqueous mixture of phenol, an aldehyde in which the aldehyde group is the sole reactive group, and an inorganic alkaline catalyst accelerating the formation of the resin reaction-product on heating, said catalyst being present in an amount equivalent to not over 10% of the total mix constituents expressed as sodium hydroxide, the molar ratio of the aldehyde to the phenol varying from 1:1 to 3:1, heat reacting said mix and producing a water soluble phenol-aldehyde reaction-product, the viscosity of the latter increasing during this initial reaction period and being indicative of the advancement of the water-soluble reaction-product towards a stage where the water-soluble state terminates, said aldehyde retaining its activity during the formation of the water-soluble phenol-aldehyde reaction-product alternately adding to said initial resin condensation product a further amount of inorganic alkaline material and then after each addition of the alkaline material condensing the alkaline treated resin reaction-product, each time the alkaline material is added there being a reduction of the viscosity of the water-soluble resin reaction-product and a tendency of the water-soluble resin reaction-product to progress towards a water-insoluble stage thereby permitting a further condensation of the resin reaction mass without conversion of the resin reaction mass to a water-insoluble state, said additions of alkali being terminated while the resin reaction-product is in a water-soluble stage, the aqueous solution of the water-soluble resin reaction product showing a precipitate upon the addition of ethanol, said alkaline material increasing the pH of the finally condensed product to between 9.5 and 14 inclusive.

5. The method of claim 1 in which the aldehyde is formaldehyde.

6. The product of the method of claim 5.

7. The method of claim 2 in which the aldehyde is formaldehyde.

8. The product of the method of claim 7.

9. The method of claim 1 in which the alkaline material is a caustic alkali.

10. The method of claim 2 in which the alkaline material is a caustic alkali.

11. The method of claim 4 in which the alkaline material is a caustic alkali.

12. The product of the method of claim 1.

DONALD V. REDFERN.

REFERENCES CITED

The following references are of record in the file of this patent:

UNITED STATES PATENTS

| Number | Name | Date |
| --- | --- | --- |
| 1,085,100 | Baekeland | Jan. 27, 1914 |
| 2,133,464 | Novotny | Oct. 18, 1938 |
| 2,150,698 | Nebin | Mar. 14, 1939 |
| 2,186,369 | Dike | Jan. 9, 1940 |
| 2,190,672 | Meharg | Feb. 20, 1940 |
| 2,360,376 | Van Epps | Oct. 17, 1944 |